United States Patent
Ma

(10) Patent No.: US 9,575,242 B2
(45) Date of Patent: Feb. 21, 2017

(54) FIXTURE FOR ASSEMBLING LIGHT STRIP AND BACK PLATE

(71) Applicants: BOE TECHNOLOGY GROUP CO., LTD., Beijing (CN); BEIJING BOE CHATANI ELECTRONICS CO., LTD., Beijing (CN)

(72) Inventor: Yongda Ma, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 100 days.

(21) Appl. No.: 14/796,066

(22) Filed: Jul. 10, 2015

(65) Prior Publication Data
US 2016/0195662 A1   Jul. 7, 2016

(30) Foreign Application Priority Data
Jan. 5, 2015   (CN) .................... 2015 2 0003556 U

(51) Int. Cl.
*F21V 19/00* (2006.01)
*F21V 8/00* (2006.01)

(52) U.S. Cl.
CPC ............. G02B 6/009 (2013.01); G02B 6/0073 (2013.01)

(58) Field of Classification Search
CPC ............................. G02B 6/009; G02B 6/0073
USPC ......................... 362/382, 410, 441, 446, 454
See application file for complete search history.

*Primary Examiner* — Vip Patel
(74) *Attorney, Agent, or Firm* — Harness, Dickey & Pierce, P.L.C.

(57) ABSTRACT

The present disclosure provides a fixture for assembling a light strip and a back plate in an edge-type backlight module. The back plate includes a bottom plate and a lateral side, the light strip includes a base plate and an LED lamp, and the base plate of the light strip is connected to the lateral side of the back plate. The fixture includes a stopper, which includes a stopping slot for allowing the lateral side of the back plate and the light strip to pass therethrough. A bottom of the stopper is of a planar structure and is in close contact with a surface of the base plate away from the bottom plate of the back plate.

12 Claims, 1 Drawing Sheet

FIXTURE FOR ASSEMBLING LIGHT STRIP AND BACK PLATE

CROSS-REFERENCE TO RELATED APPLICATION

The present disclosure claims a priority of the Chinese patent application No. 201520003556.6 filed on Jan. 5, 2015, which is incorporated herein by reference in its entirety.

TECHNICAL FIELD

The present disclosure relates to the field of display technology, in particular to a fixture for assembling a light strip and a back plate.

BACKGROUND

There is a very narrow upright edge reserved for a light-emitting diode (LED) in an edge-type backlight source, so it is very difficult to secure a light strip onto a design position when assembling the light strip. For an ultrathin design, there is a very small reserved tolerance for a thickness of the backlight source, and any tiny assembly deviation of the light strip will adversely affect an optical value of the backlight source.

SUMMARY

An object of the present disclosure is to provide a fixture for assembling a light strip and a back plate, so as to position the light strip and the back plate during the assembly in a better manner.

In one aspect, the present disclosure provides in one embodiment a fixture for assembling a light strip and a back plate in an edge-type backlight module. The back plate includes a bottom plate and a lateral side, the light strip includes a base plate and an LED lamp, and the base plate of the light strip is connected to the lateral side of the back plate. The fixture includes a stopper, which includes a stopping slot for allowing the lateral side of the back plate and the light strip to pass therethrough. A bottom of the stopper is of a planar structure and is in close contact with a surface of the base plate away from the bottom plate of the back plate.

Further, a first side wall of the stopping slot is provided with a groove for receiving the LED lamp.

Further, the groove is of a depth greater than a thickness of the LED lamp.

Further, an outer side surface of the groove is in close contact with the base plate, and/or a second side wall of the stopping slot opposite to the first side wall is in close contact with the back plate.

Further, a recessed structure is provided in the second side wall at a position corresponding to a hook of the back plate, for receiving the hook of the back plate.

Further, there is a gap between a side wall of the groove and a lateral side of the LED lamp.

Further, the stopper is provided with a handle.

In another aspect, the present disclosure provides in one embodiment a fixture for assembling a light strip and a back plate. The back plate includes a bottom plate and a lateral side formed on the back plate, the light strip includes a base plate and an LED lamp arranged on the base plate, and the base plate is connected to the lateral side. The fixture includes a stopper, and a stopping slot defined within the stopper and in communication with an outside of the stopper. The stopper includes a bottom, a first side wall and a second side wall that define the stopping slot. The bottom is of a planar structure and configured to be in close contact with an edge of the lateral side and an edge of the base plate, so as to position the lateral side and the base plate in a first direction. The first side wall and the second side wall are formed at two sides of the bottom wall, respectively. A distance between the first side wall and the second side wall is configured in such a manner that the base plate, the lateral side and a thermally conductive adhesive between the base plate and the lateral side are clamped between the first side wall and the second side wall, thereby the lateral side and the base plate are positioned in a second direction.

Further, the first side wall is provided with a groove for receiving the LED lamp.

Further, the second side wall is provided with a recessed structure for receiving a hook on the back plate.

Further, an inner surface of the stopping slot is of a step-like shape.

Further, the fixture further includes a handle arranged on the stopper.

According to the embodiments of the present disclosure, it is able to position and assemble the light strip and the back plate in a better manner, thereby to improve the optical stability of the backlight module.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
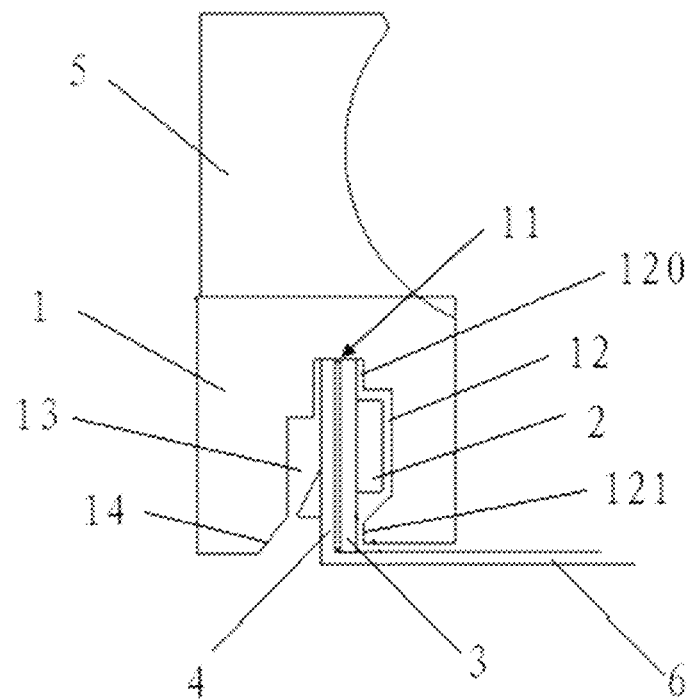
FIG. 1 is a schematic view showing a fixture for assembling a light strip and a back plate according to one embodiment of the present disclosure.
Figure 2:
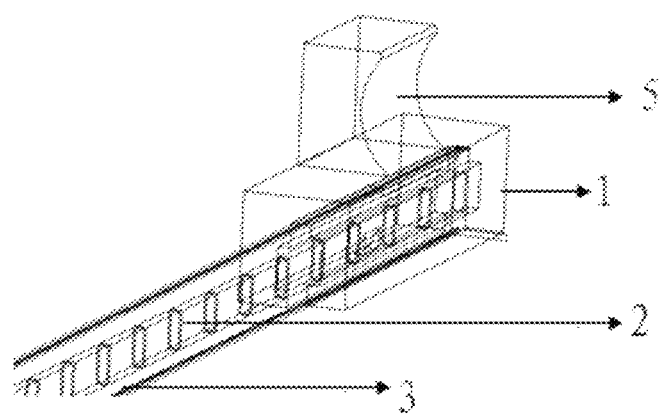
FIG. 2 is a schematic view showing a use state of the fixture for assembling the light strip and the back plate according to one embodiment of the present disclosure.

As shown in FIG. 1 and 2, the present disclosure provides in one embodiment a fixture for assembling a light strip and a back plate in an edge-type backlight module. The back plate includes a bottom plate 6 and a lateral side 4. The light strip includes a base plate 3 and an LED lamp 2. The base plate 3 of the light strip is connected to the lateral side 4 of the back plate. The fixture further includes a stopper 1, which includes a stopping slot for allowing the lateral side 4 of the back plate and the light strip to pass therethrough. A bottom 11 of the stopping slot is of a planar structure. The bottom 11 of the stopping slot may be in close contact with a surface of the base plate 3 away from the bottom plate 6 of the back plate.

In a process of connecting the light strip onto the back plate through a thermally conductive adhesive, the bottom 11 of the stopping slot is in close contact with the surface of the base plate 3 away from the bottom plate 6 of the back plate, so that an edge of the light strip is flush with an edge of the lateral side 4 of the back plate, thereby positioning the light strip and the bottom plate 6 of the back plate in a better manner.

Alternatively, the stopper 1 may be of a length not less than the light strip. When the light strip and the back plate are positioned and assembled, the stopper 1 is sleeved onto the lateral side 4 of the back plate connected with the light strip, so that the bottom 11 of the stopping slot is in close contact with the surface of the base plate 3 of the light strip away from the bottom plate 6 of the back plate. In other words, a force is applied to the base plate 3 of the light strip in a direction perpendicular to the bottom plate of the back plate, so as to move an offset portion of the light strip in a direction close to the bottom plate 6 of the back plate, thereby to control an offset amount of the light strip in a direction parallel to the lateral side 4 of the back plate within an allowable range.

Alternatively, the length of the stopper 1 may not be particularly defined. As shown in FIG. 2, the length of the stopper 1 is less than that of the light strip. When the light strip and the back plate are positioned and assembly, the stopper 1 is sleeved onto the lateral side 4 of the back plate connected with the light strip, the bottom 11 of the stopping slot is in close contact with the surface of the base plate 3 away from the bottom plate 6 of the back plate, and the stopper 1 moves from one end of the lateral side 4 of the back plate toward the other end, so as to control the offset amount of the light strip in the direction parallel to the lateral side 4 of the back plate within the allowable range.

Alternatively, in order to prevent the LED lamp 2 from being damaged when the light strip and the back plate are positioned and assembled, a first side wall of the stopping slot is provided with a groove 12 for receiving the LED lamp.

Alternatively, the groove 12 is of of a depth greater than a thickness of the LED lamp 2.

Alternatively, there is a gap between a side wall of the groove 12 and a lateral side of the LED lamp 2. In other words, there are gaps between a bottom as well as the side wall of the groove 12 and the LED lamp 2, so as to prevent the stopper 1 from contacting the LED lamp 2 and thus prevent the LED lamp 2 from being damaged.

Alternatively, in order to ensure stable connection between the light strip and the back plate, an outer side surface of the groove 12 (as shown in FIG. 1, the outer side surface of the groove 12 includes a first side surface 120 close to the bottom 11 of the stopping slot and a second side surface 121 away from the bottom 11 of the stopping slot) may be in close contact with the base plate 3, and/or, a second side wall of the stopping slot opposite to the first side wall may be in close contact with the back plate.

When the light strip and the back plate are positioned and assembled, a force is applied by the outer side surface of the groove 12 to the base plate 3, and/or a force is applied by the second side wall to the back plate, so as to make the thermally conductive adhesive be fully attached between the light strip and the back plate, thereby to ensure the stable connection between the light strip and the back plate and reduce the entire thickness after the light strip is connected to the lateral side 4 of the back plate.

Alternatively, the side wall of the groove 12 away from the bottom 11 of the stopping slot is a surface oblique toward a direction away from the bottom 11 of the stopping slot, so as to facilitate engagement and disengagement of the stopper with the lateral side of the back plate connected with the light strip.

Alternatively, the second side wall is of a structure is adapted to a surface of the lateral side of the back plate opposite to the second side wall. As shown in FIG. 1, a hook is provided at one surface of the lateral side 4 of the back plate opposite to the second side wall, and a recessed structure 13 is provided in the second side wall at a position corresponding to the hook on the back plate so as to receive the hook.

Alternatively, a chamfer 14 is provided at a joint between the second side wall and the corresponding outer side surface of the stopping slot, so as to facilitate engagement and disengagement of the stopper 1 with the lateral side 4 of the back plate.

The light strip and the back plate may be positioned and assembled automatically or manually. In one embodiment of the present disclosure, the light strip and the back plate are positioned and assembled manually. As shown in FIGS. 1 and 2, the stopper 1 is provided with a handle 5. When the light strip and the back plate are positioned and assembled, the stopper 1 is hold through the handle 5 and the stopper is pressed against the lateral side 4 of the back plate connected with the light strip, so as to stop the light strip.

Alternatively, the stopper 1 is made of an elastic material, so as to facilitate the movement of the stopper 1 in a lengthwise direction of the light strip and enable the stopper to stop the light strip, thereby to facilitate the assembly thereof.

The above are merely the preferred embodiments of the present disclosure. It should be appreciated that, a person skilled in the art shall make further modifications and improvements without departing from the principle of the present disclosure, and these modifications and improvements shall also fall within the scope of the present disclosure.

What is claimed is:

1. A fixture for assembling a light strip and a back plate in an edge-type backlight module, the back plate comprising a bottom plate and a lateral side, the light strip comprising a base plate and a light-emitting diode (LED) lamp, the base plate of the light strip being connected to the lateral side of the back plate, the fixture comprising a stopper;
    wherein the stopper comprises a stopping slot for allowing the lateral side of the back plate and the light strip to pass therethrough; and a bottom of the stopping slot is of a planar structure and is in close contact with a surface of the base plate away from the bottom plate of the back plate.

2. The fixture according to claim 1, wherein a first side wall of the stopping slot is provided with a groove for receiving the LED lamp.

3. The fixture according to claim 2, wherein the groove is of a depth greater than a thickness of the LED lamp.

4. The fixture according to claim 3, wherein an outer side surface of the groove is in close contact with the base plate, and/or, a second side wall of the stopping slot opposite to the first side wall is in close contact with the back plate.

5. The fixture according to claim 4, wherein a recessed structure is provided in the second side wall at a position corresponding to a hook of the back plate, for receiving the hook of the back plate.

6. The fixture according to claim 2, wherein there is a gap between a side wall of the groove and a lateral side of the LED lamp.

7. The fixture according to claim 1, wherein the stopper is provided with a handle.

8. A fixture for assembling a light strip and a back plate, the back plate comprising a bottom plate and a lateral side formed on the back plate, the light strip comprising a base plate and a light-emitting diode (LED) lamp arranged on the base plate, the base plate being connected to the lateral side;
    wherein the fixture comprises a stopper, and a stopping slot defined within the stopper and in communication with an outside of the stopper;
    the stopper comprises a bottom, a first side wall and a second side wall that define the stopping slot;

the bottom is of a planar structure and configured to be in close contact with an edge of the lateral side and an edge of the base plate, so as to position the lateral side and the base plate in a first direction;

the first side wall and the second side wall are formed at two sides of the bottom, respectively; and a distance between the first side wall and the second side wall is configured in such a manner that the base plate, the lateral side and a thermally conductive adhesive between the base plate and the lateral side are clamped between the first side wall and the second side wall, thereby the lateral side and the base plate are positioned in a second direction.

9. The fixture according to claim 8, wherein the first side wall is provided with a groove for receiving the LED lamp.

10. The fixture according to claim 8, wherein the second side wall is provided with a recessed structure for receiving a hook on the back plate.

11. The fixture according to claim 10, wherein an inner surface of the stopping slot is of a step-like shape.

12. The fixture according to claim 8, further comprising a handle arranged on the stopper.

* * * * *